US009796376B2

(12) United States Patent
Inoue et al.

(10) Patent No.: US 9,796,376 B2
(45) Date of Patent: Oct. 24, 2017

(54) HYBRID VEHICLE, CONTROL METHOD FOR HYBRID VEHICLE, AND CONTROLLER FOR HYBRID VEHICLE

(71) Applicant: TOYOTA JIDOSHA KABUSHIKI KAISHA, Toyota-shi, Aichi-ken (JP)

(72) Inventors: Toshio Inoue, Gotenba (JP); Shunsuke Fushiki, Susono (JP); Tomoaki Honda, Gotenba (JP); Keita Fukui, Fujinomiya (JP); Hidekazu Nawata, Gotenba (JP); Yuta Niwa, Mishima (JP); Taichi Ohsawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/032,509

(22) PCT Filed: Nov. 3, 2014

(86) PCT No.: PCT/IB2014/002305
§ 371 (c)(1),
(2) Date: Apr. 27, 2016

(87) PCT Pub. No.: WO2015/068010
PCT Pub. Date: May 14, 2015

(65) Prior Publication Data
US 2016/0272194 A1     Sep. 22, 2016

(30) Foreign Application Priority Data

Nov. 5, 2013 (JP) .................................. 2013-229369

(51) Int. Cl.
*B60W 10/06* (2006.01)
*F02P 3/09* (2006.01)
(Continued)

(52) U.S. Cl.
CPC ............... *B60W 20/40* (2013.01); *B60K 6/24* (2013.01); *B60K 6/26* (2013.01); *B60K 6/28* (2013.01);
(Continued)

(58) Field of Classification Search
CPC ..... B60W 10/06; F01N 3/2013; B60L 11/123; B60L 11/12; B60K 6/26; F02B 25/12; F02P 3/09
See application file for complete search history.

(56) References Cited

U.S. PATENT DOCUMENTS 6,052,988 A * 4/2000 Ikeda .................... F01N 3/2013
                                                219/202
2005/0109550 A1* 5/2005 Buglione ................. B60K 6/26
                                                180/65.25
(Continued)

FOREIGN PATENT DOCUMENTS

JP      S61-199135 U    12/1986
JP      H09-233733 A     9/1997
(Continued)

OTHER PUBLICATIONS

Partial translation of Sep. 11, 2015 Office Action issued in Japanese Patent Application No. 2013-229369.

*Primary Examiner* — Yuri Kan
(74) *Attorney, Agent, or Firm* — Oliff PLC

(57) ABSTRACT

A hybrid vehicle includes an internal combustion engine, a rotating electric machine, an electric storage device, a power supply device, and a controller. The controller executes switching control to switch from a first electric power supply to a second electric power supply by starting the internal combustion engine. The first electric power supply is the supply of electric power from the electric storage device to the electric device. The second electric power supply is the supply of electric power from the rotating electric machine
(Continued)

to the electric device. The controller controls the power supply device and the internal combustion engine such that the internal combustion engine is started with the first electric power supply being continued during the switching control.

8 Claims, 4 Drawing Sheets

(51) Int. Cl.
*F02B 25/12* (2006.01)
*B60K 6/26* (2007.10)
*B60W 20/40* (2016.01)
*B60W 10/08* (2006.01)
*B60W 10/26* (2006.01)
*B60W 30/18* (2012.01)
*B60W 20/10* (2016.01)
*B60L 3/00* (2006.01)
*B60L 3/04* (2006.01)
*B60L 7/14* (2006.01)
*B60L 11/12* (2006.01)
*B60L 11/14* (2006.01)
*B60L 11/18* (2006.01)
*B60L 15/20* (2006.01)
*B60K 6/24* (2007.10)
*B60K 6/28* (2007.10)
*B60K 6/365* (2007.10)
*B60K 6/40* (2007.10)

(52) U.S. Cl.
CPC ............... *B60K 6/365* (2013.01); *B60K 6/40* (2013.01); *B60L 3/0046* (2013.01); *B60L 3/04* (2013.01); *B60L 7/14* (2013.01); *B60L 11/123* (2013.01); *B60L 11/14* (2013.01); *B60L 11/1816* (2013.01); *B60L 11/1842* (2013.01); *B60L 11/1844* (2013.01); *B60L 11/1846* (2013.01); *B60L 11/1859* (2013.01); *B60L 15/20* (2013.01); *B60L 15/2009* (2013.01); *B60L 15/2054* (2013.01); *B60W 10/06* (2013.01); *B60W 10/08* (2013.01); *B60W 10/26* (2013.01); *B60W 20/10* (2013.01); *B60W 30/18054* (2013.01); *B60K 2006/268* (2013.01); *B60L 2210/10* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/445* (2013.01); *B60L 2240/486* (2013.01); *B60L 2240/80* (2013.01); *B60L 2260/26* (2013.01); *B60L 2270/12* (2013.01); *B60L 2270/145* (2013.01); *B60W 2710/06* (2013.01); *B60W 2710/242* (2013.01); *B60Y 2200/92* (2013.01); *Y02E 60/721* (2013.01); *Y02T 10/6217* (2013.01); *Y02T 10/6286* (2013.01); *Y02T 10/645* (2013.01); *Y02T 10/705* (2013.01); *Y02T 10/7005* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 10/126* (2013.01); *Y04S 30/14* (2013.01); *Y10S 903/905* (2013.01); *Y10S 903/906* (2013.01); *Y10S 903/907* (2013.01); *Y10S 903/91* (2013.01); *Y10S 903/93* (2013.01); *Y10S 903/951* (2013.01)

(56) References Cited

U.S. PATENT DOCUMENTS

| 2009/0015201 | A1* | 1/2009 | Fukumura | B60K 6/46 320/130 |
| 2009/0205331 | A1* | 8/2009 | Marsh | F02B 25/12 60/599 |
| 2010/0319645 | A1* | 12/2010 | Yang | F02P 3/096 123/179.5 |
| 2011/0304139 | A1* | 12/2011 | Hashizume | B60L 11/12 290/7 |
| 2014/0232182 | A1* | 8/2014 | Kinomura | B60L 11/123 307/10.1 |
| 2014/0375067 | A1* | 12/2014 | Yang | H02J 1/108 290/38 R |
| 2015/0270745 | A1* | 9/2015 | Ogura | H02J 3/383 307/66 |

FOREIGN PATENT DOCUMENTS

| JP | 2007-236023 A | 9/2007 |
| JP | 2008-247252 A | 10/2008 |
| JP | 2013-051772 A | 3/2013 |
| JP | 2013-189161 A | 9/2013 |
| JP | 2013184642 A | 9/2013 |

\* cited by examiner

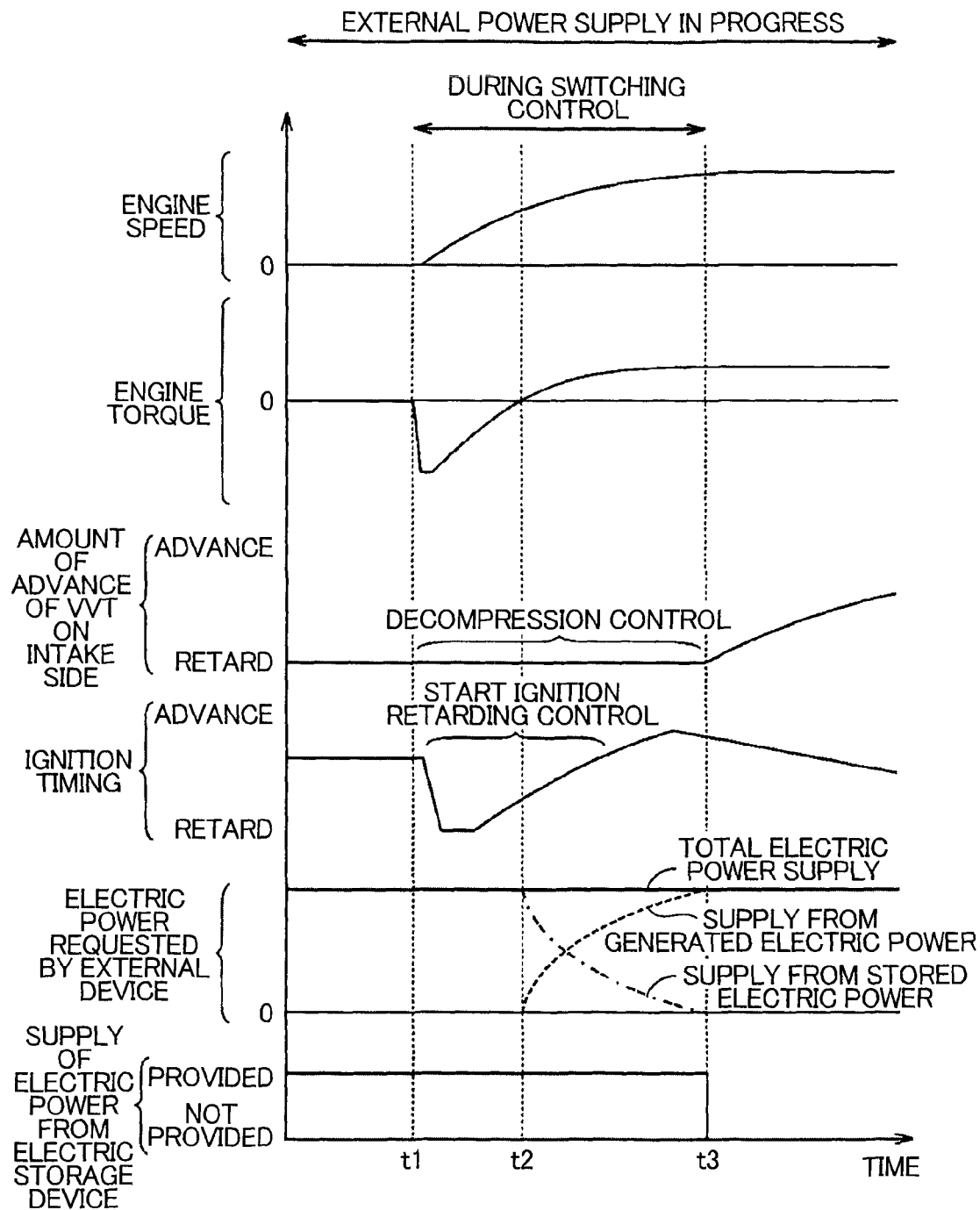

HYBRID VEHICLE, CONTROL METHOD FOR HYBRID VEHICLE, AND CONTROLLER FOR HYBRID VEHICLE

BACKGROUND OF THE INVENTION

1. Field of the Invention

The present invention relates to a hybrid vehicle, a control method for a hybrid vehicle, and a controller for a hybrid vehicle. More specifically, the present invention relates to a hybrid vehicle that can supply electric power to an electric device outside the vehicle, a control method for the hybrid vehicle, and a controller for the hybrid vehicle.

2. Description of Related Art

Japanese Patent Application Publication No. 2007-236023 (JP 2007-236023 A) discloses a hybrid vehicle that can supply electric power to an electric device outside the vehicle. The hybrid vehicle selects, when a power supply connector is connected thereto, whether to supply electric power that has been stored in a battery to an electric device outside the vehicle or to supply electric power that is generated using the driving force of the engine to an electric device outside the vehicle based on the remaining battery level.

When electric power that is generated using the driving force of the engine is supplied to an electric device outside the vehicle, the engine must be started to obtain generated electric power. However, immediately after the engine is started, a sufficient electric power supply may not be provided to the electric device outside the vehicle because of a delay in response of engine torque. At this time, it is difficult to supply electric power stably to the electric device outside the vehicle because of shortage of electric power that can be supplied to the electric device outside the vehicle.

SUMMARY OF THE INVENTION

It is, therefore, an object of the present invention to provide a hybrid vehicle that can supply electric power stably to an electric device outside the vehicle, a control method for the hybrid vehicle, and a controller for the hybrid vehicle.

In a first aspect of the present invention, a hybrid vehicle includes an internal combustion engine, a rotating electric machine, an electric storage device, a power supply device, and a controller. The rotating electric machine is configured to generate electric power using driving force of the internal combustion engine. The electric storage device is configured to be charged and discharged. The power supply device is configured to supply at least one of the generated electric power from the rotating electric machine or electric power stored in the electric storage device to an electric device outside the hybrid vehicle. The controller is configured to execute switching control to switch from a first electric power supply to a second electric power supply by starting the internal combustion engine. The first electric power supply is a supply of electric power from the electric storage device to the electric device. The second electric power supply is a supply of electric power from the rotating electric machine to the electric device. The controller controls the power supply device and the internal combustion engine, during the switching control, such that the internal combustion engine is started with the first electric power supply being continued. The term "during the switching control" refers to the period from the time when the internal combustion engine is started until the time when a state is reached where the electric power that must be supplied to an electric device outside the vehicle is covered only by the generated electric power that is derived from the internal combustion engine.

According to this configuration, when the switching control is executed, the internal combustion engine is started and the generated electric power that is derived from the driving force of the internal combustion engine is supplied to the electric device. At this time, because the supply of electric power from the electric storage device to the electric device is continued, the shortage of the generated electric power due to a delay in response of the driving force of the internal combustion engine can be compensated for by the stored electric power. Thus, electric power can be supplied stably to the electric device outside the vehicle.

In this aspect, the controller may control the power supply device and the internal combustion engine, during the switching control, such that the first electric power supply is continued until a predetermined period of time elapses after the start of the internal combustion engine.

According to this configuration, electric power can be supplied from the electric storage device to the electric device only for a necessary period that has been preliminarily determined in view of the shortage of the generated electric power at the start of the internal combustion engine. Thus, over-discharge of the electric storage device can be prevented.

In this aspect, the controller, during the switching control, may predict shortage of the generated electric power relative to the electric power that must be supplied to the electric device. In addition, the controller may control the power supply device and the internal combustion engine such that electric power in an amount equal to the predicted shortage is supplied from the electric storage device to the electric device.

According to this configuration, an excessive supply of electric power from the electric storage device can be prevented. As a result, the power input and output of the electric storage device can be reduced and the electricity efficiency can be improved.

In this aspect, the controller may predict the shortage of electric power based on a delay in response of driving force of the internal combustion engine at the start of the internal combustion engine.

According to this configuration, the shortage of electric power can be predicted precisely in view of a delay in response of the driving force of the internal combustion engine.

In this aspect, the controller may control the power supply device and the internal combustion engine such that the first electric power supply is executed during the switching control and when the generated electric power corresponding to the driving force of the internal combustion engine is insufficient relative to the electric power that must be supplied to the electric device.

According to this configuration, the individual peculiarities of the internal combustion engine, the changes of the internal combustion engine with the passage of time, or the changes in output from the internal combustion engine depending on the operating environment can be detected. Thus, the shortage of generated electric power can be detected precisely.

In another aspect of the present invention, a hybrid vehicle includes an internal combustion engine, a rotating electric machine, an electric storage device, a power supply device, and a, controller. The rotating electric machine is configured to generate electric power using driving force of the internal combustion engine. The electric storage device is configured to be charged and discharged. The power supply device supplies at least one of the generated electric power from the rotating electric machine or electric power stored in the electric storage device to an electric device outside the hybrid vehicle. A control method for the hybrid vehicle includes executing switching control, by the controller, to switch from a first electric power supply to a second electric power supply by starting the internal combustion engine, and controlling the power supply device and the internal combustion engine, by the controller, such that the internal combustion engine is started with the first electric power supply being continued during the switching control. The first electric power supply is a supply of electric power from the electric storage device to the electric device. The second electric power supply is a supply of electric power from the rotating electric machine to the electric device.

According to this configuration, when the switching control is executed, the internal combustion engine is started and the generated electric power that is derived from the driving force of the internal combustion engine is supplied to the electric device. At this time, because the supply of electric power from the electric storage device to the electric device is continued, the shortage of the generated electric power due to a delay in response of the driving force of the internal combustion engine can be compensated for by the stored electric power. Thus, electric power can be supplied stably to the electric device outside the vehicle.

In the other aspect of the present invention, a hybrid vehicle includes an internal combustion engine, a rotating electric machine, an electric storage device, a power supply device, and a controller. The rotating electric machine is configured to generate electric power using driving force of the internal combustion engine. The electric storage device is configured to be charged and discharged. The power supply device is configured to supply electric power to an electric device outside the hybrid vehicle through at least one of a first power supply path or a second power supply path. The first power supply path is a power supply path through which electric power stored in the electric storage device is supplied to the electric device. The second power supply path is a power supply path through which the generated electric power that is derived from the driving force of the internal combustion engine is supplied to the electric device. The controller is configured to control, during the switching control in which the power supply device is controlled to switch the power supply path from the first power supply path to the second power supply path, the power supply device and the internal combustion engine such that the internal combustion engine is started with electric power being supplied to the electric device through the first power supply path and the second power supply path. The term "during the switching control" refers to the period from the time when the internal combustion engine is started until the time when a state is reached where the electric power that must be supplied to an electric device outside the vehicle is covered only by the generated electric power that is derived from the internal combustion engine.

In this aspect, the controller may control the power supply device and the internal combustion engine, during the switching control, such that electric power is supplied to the electric device through the first power supply path and the second power supply path until a predetermined period of time has elapsed after the start of the internal combustion engine and the power supply path is switched from the first power supply path to the second power supply path when the predetermined period of time has elapsed.

In the other aspect of the present invention, a controller for a hybrid vehicle includes an ECU. The hybrid vehicle includes an internal combustion engine, a rotating electric machine, an electric storage device, a power supply device, and the controller. The rotating electric machine is configured to generate electric power using driving force of the internal combustion engine. The electric storage device is configured to be charged and discharged. The power supply device is configured to supply electric power to an electric device outside the hybrid vehicle through at least one of a first power supply path or a second power supply path. The first power supply path is a power supply path through which electric power stored in the electric storage device, is supplied to the electric device. The second power supply path is a power supply path through which the generated electric power that is derived from the driving force of the internal combustion engine is supplied to the electric device. The ECU is configured to control, during the switching control in which the power supply device is controlled to switch the power supply path from the first power supply path to the second power supply path, the power supply device and the internal combustion engine such that the internal combustion engine is started with electric power being supplied to the electric device through the first power supply path and the second power supply path. The term "during the switching control" refers to the period from the time when the internal combustion engine is started until the time when a state is reached where the electric power that must be supplied to an electric device outside the vehicle is covered only by the generated electric power that is derived from the internal combustion engine.

In this aspect, the ECU may control the power supply device and the internal combustion engine, during the switching control, such that electric power is supplied to the electric device through the first power supply path and the second power supply path until a predetermined period of time has elapsed after the start of the internal combustion engine and the power supply path is switched from the first power supply path to the second power supply path when the predetermined period of time has elapsed.

According to the invention, it is possible to provide a hybrid vehicle that can supply electric power stably to an electric device outside the vehicle and a control method for the hybrid vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a time chart that shows one example of switching control that is executed by the controller that is shown in FIG. 1.

DETAILED DESCRIPTION OF EMBODIMENTS

Figure 1:
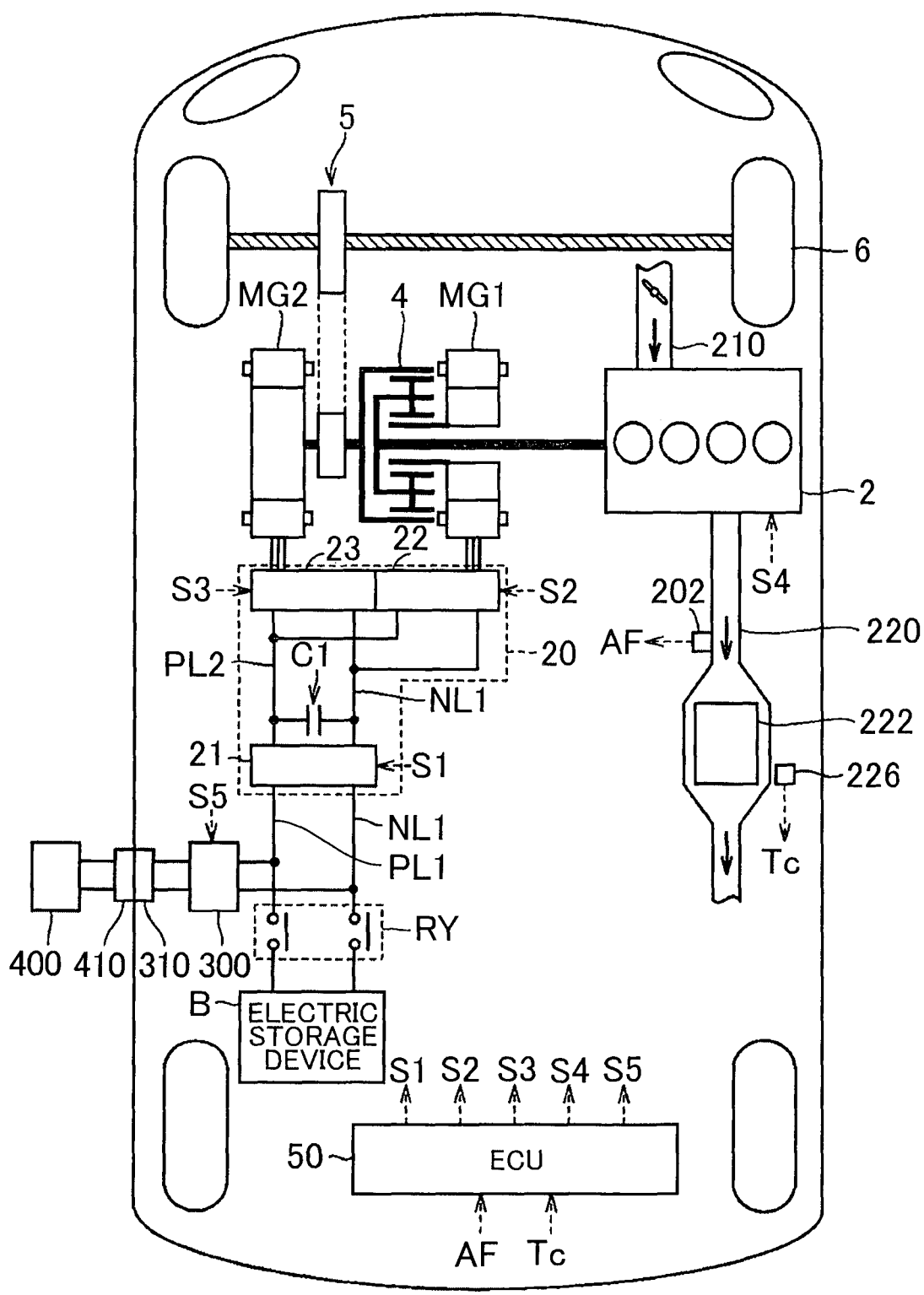
FIG. 1 is a block diagram that illustrates the general configuration of a hybrid vehicle according to an embodiment of the present invention.

An embodiment of the present invention is hereinafter described in detail with reference to the drawings. The same or corresponding parts are designated by the same reference numerals in all the drawings and their description is not repeated.

FIG. 1 is a block diagram that illustrates the general configuration of a hybrid vehicle according to an embodiment of the present invention. Referring to FIG. 1, a hybrid vehicle 100 includes an engine 2, motor generators MG1 and MG2, a power split device 4, a reduction gear 5, driving wheels 6, an electric storage device B, a PCU (Power Control Unit) 20, and a controller (which may be hereinafter also referred to as "ECU (Electronic Control Unit") 50.

The engine 2 is an internal combustion engine that generates driving force for rotating a crankshaft by combustion energy that is produced by combusting a mixture of air and fuel that is drawn into its combustion chambers. The motor generators MG1 and MG2 are AC electric motors, such as three-phase AC synchronous motors.

The hybrid vehicle 100 travels on the driving force that is output from at least one of the engine 2 and the motor generator MG2. The driving force that is produced by the engine 2 is split into two paths by the power split device 4. One of the paths is a path through which the driving force is transmitted to the driving wheels 6 via the reduction gear 5 and the other is a path through which the driving force is transmitted to the motor generator MG1.

When the vehicle is stationary, the motor generator MG1 can generate electric power using the driving force of the engine 2. The electric power that is generated in this way may be transmitted to the electric storage device B to charge it or may be transmitted to an electric device outside the vehicle as described in detail later.

The power split device 4 includes a planetary gear that consists of a sun gear, pinion gears, a carrier and a ring gear. The pinion gears mesh with the sun gear and the ring gear. The carrier rotatably supports the pinion gears and is coupled to the crankshaft of the engine 2. The sun gear is coupled to a rotating shaft of the motor generator MG1. The ring gear is coupled to a rotating shaft of the motor generator MG2 and the reduction gear 5.

The electric storage device B is an electric power storage element, that is configured to be able to be charged and discharged. The electric storage device B includes a secondary battery, such as a lithium-ion battery, nickel-hydrogen battery or lead battery, or cells of an electric storage element, such as an electric double layer capacitor.

The electric storage device B is connected via a relay RY to the PCU 20 that is used to drive the motor generators MG1 and MG2. The electric storage device B supplies electric power that is used to produce driving force for driving the hybrid vehicle 100 to the PCU 20. The electric storage device B can also supply electric power to an electric device outside the vehicle as described in detail later. In addition, the electric storage device B stores electric power that is generated by the motor generators MG1 and MG2. The electric storage device B has an output of, for example, 200 V.

The PCU 20 includes a converter 21, inverters 22 and 23, and a capacitor C1. The converter 21 executes voltage conversion between electric power lines PL1 and NL1 and between electric power lines PL2 and NL1 based on a control signal S1 from the ECU 50.

The inverters 22 and 23 are connected in parallel to the electric power lines PL2 and NL1. The inverters 22 and 23 convert DC electric power that is supplied from the converter 21 into AC electric power and drive the motor generators MG1 and MG2, respectively, based on control signals S2 and S3, respectively, from the ECU 50. The capacitor C1 is provided between the electric power lines PL2 and NL1, and reduces voltage fluctuation between the electric power lines PL2 and NL1.

In the engine 2, the throttle opening, the ignition timing, the fuel injection timing, the fuel injection amount, and the operating conditions of the intake valves (opening-closing timing, lift, working angle, etc.) are controlled based on a control signal S4 from the ECU 50 to bring the engine 2 to desired operating conditions. Air is introduced into the engine 2 through an intake passage 210. The exhaust gas that is discharged from the engine 2 is discharged out of the vehicle through an exhaust passage 220. A catalyst 222 is provided in the exhaust passage 220. The catalyst 222 is provided to clean the exhaust gas. The catalyst 222 is a three-way catalyst, for example, and cleans carbon monoxide (CO), hydrocarbons (HC), NOx and PM that are contained in the exhaust gas.

A temperature sensor 226 is provided on the catalyst 222. that the temperature sensor 226 is used to detect a catalyst temperature Tc which indicates the temperature of the catalyst 222. The temperature sensor 226 outputs a detection value of the catalyst temperature Tc to the ECU 50. The ECU 50 may estimate a catalyst temperature Tc based on a parameter that is used to control the engine 2 instead of an output from the temperature sensor 226.

An air-fuel ratio sensor 202 is provided on the exhaust passage 220. The air-fuel ratio sensor 202 is used to detect the air-fuel ratio of the exhaust gas. The air-fuel ratio sensor 202 outputs a detection value of an air-fuel ratio AF of the exhaust gas to the ECU 50.

The catalyst 222 may include a first-stage catalyst and a second-stage catalyst that are located upstream and downstream of each other in the exhaust passage 220. The air-fuel ratio sensor 202 may be located upstream of the first-stage catalyst, between the first-stage catalyst and the second-stage catalyst, or downstream of the second-stage catalyst.

The catalyst 222 is characterized by having a high conversion efficiency when warmed up to a predetermined temperature. Thus, to improve the emission of the hybrid vehicle 100, the catalyst 222 must be warmed up to a predetermined temperature when the engine 2 starts to be operated.

In one instance, the ECU 50 executes catalyst warm-up control to increase the exhaust gas temperature by retarding the ignition timing of the engine 2 in order to warm up the catalyst 222. When the catalyst warm-up control is executed, the torque of the engine 2 decreases because the operating efficiency of the engine 2 decreases.

The ECU 50 also executes decompression control to reduce vibration of the engine 2 when the engine 2 is started. Specifically, in the decompression control, a VVT (Variable Valve Timing) device is used to delay the timing of closure of the intake valves to reduce the amount of air that is drawn into the engine 2. Then, vibration is suppressed because the compression ratio decreases, and the torque of the engine 2 decreases. The decompression control may be also executed when the load, of the engine 2 is low.

In addition, the ECU 50 executes start ignition retarding control to prevent a shock that may be caused by a sudden increase of engine torque when the engine 2 is started. In the start ignition retarding control, the ignition timing is retarded after the engine 2 is started, and then the ignition timing is gradually advanced. This helps the engine torque to increase gently.

The hybrid vehicle 100 also includes a power supply device 300 and a power supply port 310 as means that are used to supply electric power to an electric device outside the vehicle. The electric device outside the vehicle may be hereinafter also referred to as "external device," and the supply of electric power to an external device may be hereinafter also referred to as "external power supply."

The power supply port 310 is an electric power interface that is used to supply electric power to an external device 400. The power supply port 310 is configured to be connectable to a connector 410 that is connected to the external device 400.

The power supply device 300 is located among the power supply port 310, the electric storage device B and the PCU 20. The power supply device 300 converts, based on a control signal S5 from the ECU 50, electric power (DC) into electric power (AC) and outputs the electric power (AC) to the power supply port 310. The electric power (DC) is supplied from at least one of the electric storage device B and the PCU 20. The electric power (AC) is suited to the external device 400.

Figure 2:
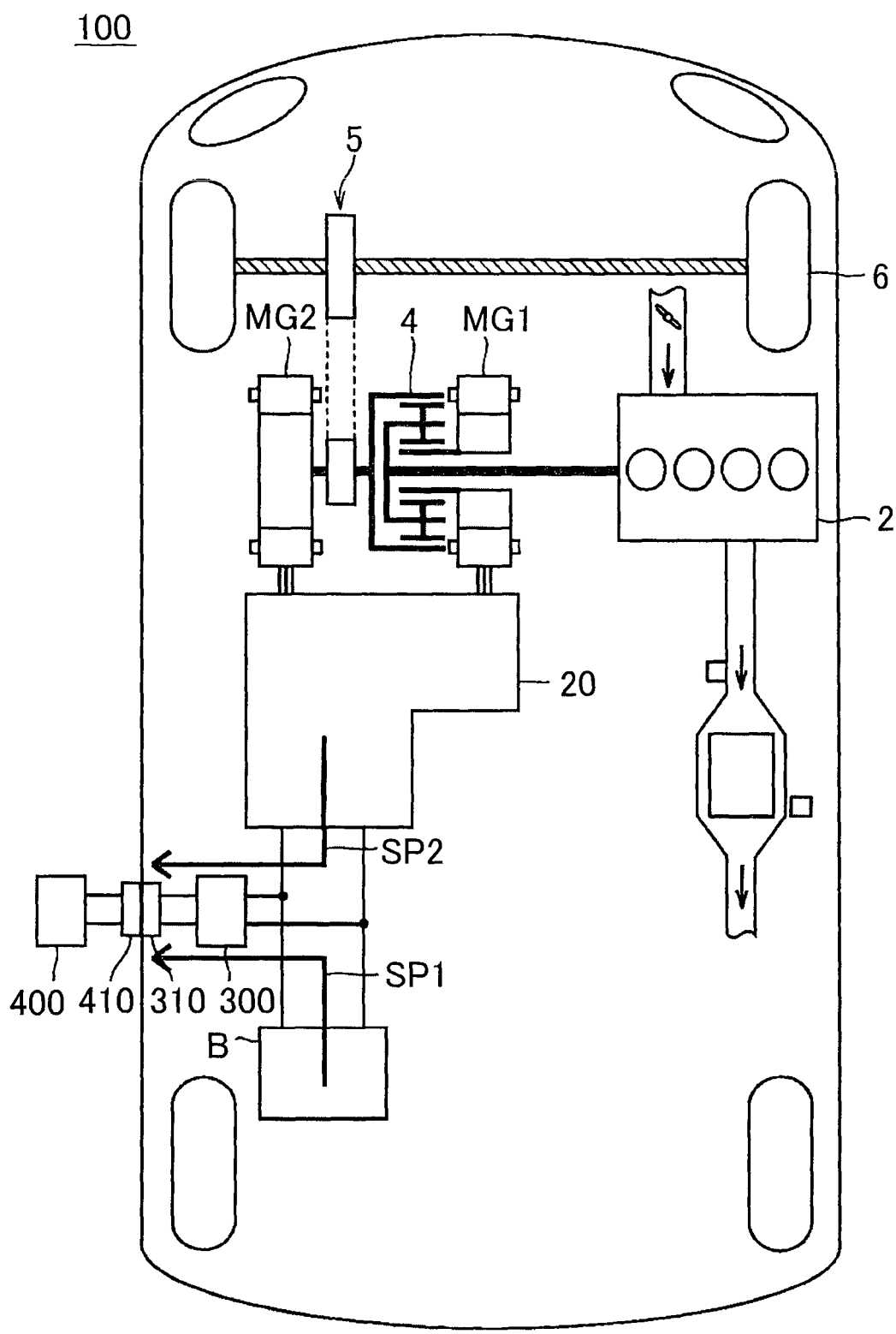
FIG. 2 is a diagram that illustrates power supply paths that are used to provide external power supply in the hybrid vehicle that is shown in FIG. 1.

FIG. 2 is a diagram that illustrates power supply paths that are used to provide external power supply in the hybrid vehicle 100 that is shown in FIG. 1. Referring to FIG. 2, an arrow SP1 indicates a first power supply path through which the stored electric power is supplied to the external device 400. The stored electric power is the electric power that has been stored in the electric storage device B, An arrow SP2 indicates a second power supply path through which the generated electric power is supplied to the external device 400. The generated electric power is the electric power that is generated using the driving force of the engine 2.

In the above configuration, the power supply paths may be switched during the external power supply in some cases. For example, the external power supply can be provided through the first power supply path when sufficient electric power has been stored in the electric storage device B, but, when the level of stored electric power in the electric storage device B has decreased, the power supply path may have to be switched to the second power supply path to continue the external power supply. In such a case, it is desirable to stop the supply of electric power from the electric storage device B and start the supply of the generated electric power as soon as the switching of power supply paths is requested in order to prevent over-discharge of the electric storage device B.

The switching of power supply paths is attained by, for example, ensuring that the external power supply is executed through the first power supply path when the power generation using the driving, force of the engine 2 is not in progress and that the external power supply is executed through the second power supply path when the level of the generated electric power that is derived from the driving force of the engine 2 is equal to or higher than the level of electric power that must be supplied to the external device 400.

When the power supply path is switched from the first power supply path to the second power supply path when the external power supply is in progress, the engine 2 must be started to obtain generated electric power. However, immediately after the engine 2 is started, a sufficient electric power supply to the external device 400 may not be provided because of a delay in response of engine torque.

Specifically, when the engine 2 is started, sufficient generated electric power to provide the external power supply may not be obtained because the engine torque is decreased by the effect of the decompression control, the start ignition retarding control and the catalyst warm-up control. At this time, it is difficult to supply electric power stably to the external device 400 because of shortage of electric power that can be supplied to the external device 400.

In this embodiment, while the switching control is being executed to switch the power supply path from the first power supply path to the second power supply path, the power supply device 300 and the engine 2 are controlled such that the engine 2 is started with the supply of electric power from the electric storage device B to the external device 400 being continued. As a result, electric power continues to be supplied from the electric storage device B to the external device 400 during the switching control. Therefore, the shortage of the generated electric power can be compensated for by the stored electric power. Thus, electric power can be supplied stably to the external device 400. The details of the switching control are described more fully below.

Figure 3:
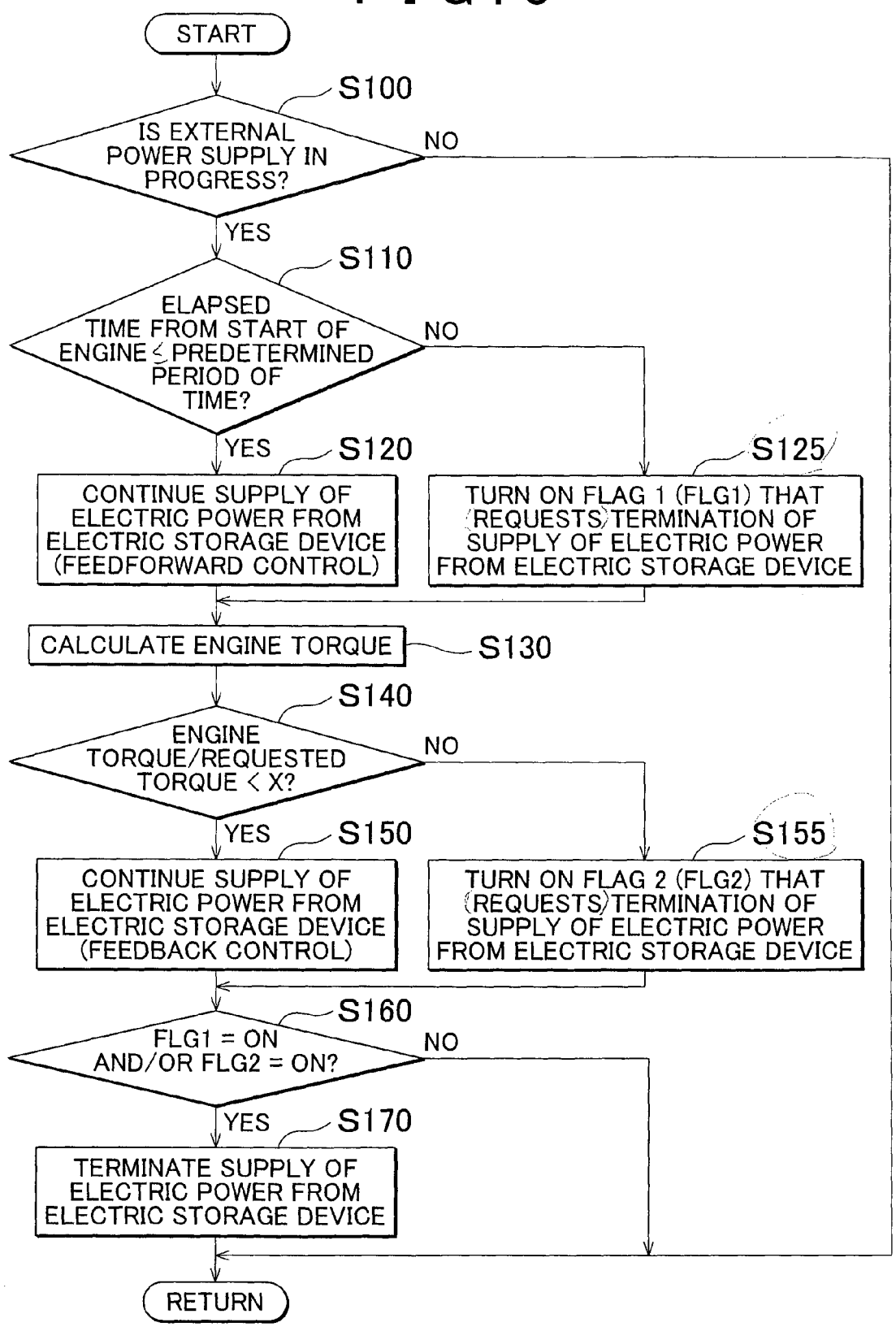
FIG. 3 is a flowchart that shows the control structure of switching control that is executed by the controller that is shown in FIG. 1.

FIG. 3 is a flowchart that shows the control structure of the switching control that is executed by the ECU 50 that is shown in FIG. 1. The flowchart that is shown in FIG. 3 is realized by executing a program that has been preliminarily stored in the ECU 50 at predetermined intervals. Alternatively, the processing in some of the steps may be realized by constructing dedicated hardware (electronic circuit).

Referring to FIG. 1 together with FIG. 3, the ECU 50 determines in step ("step" is hereinafter abbreviated as "S") 100 whether the external power supply is in progress. When it is determined that the external power supply is not in progress (NO in S100), the subsequent processing is skipped and the control is returned to the main routine.

When it is determined that the external power supply is in progress (YES in S100), the ECU 50 determines whether the elapsed time from the start of the engine 2 is within a predetermined period of time (S110). The predetermined period of time is the period of time during which a delay in response of driving force is created by the effect of the start of the engine. Specifically, it is the period of time from the time when the engine 2 is started until the time when the decompression control, the start ignition retarding control and the catalyst warm-up control are completed.

When it is determined that the elapsed time from the start of the engine 2 is within the predetermined period of time (YES in S110), the ECU 50 continues the supply of electric power from the electric storage device B to the external device 400 (S120). At this time, the ECU 50 calculates the delay in response of driving force of the engine 2 based on the information of execution of the decompression control, the start ignition retarding control and the catalyst warm-up control. The ECU 50 predicts the shortage of the generated electric power that is derived from the driving force of the engine 2 relative to the electric power that must be supplied to the external device 400 based on the calculated delay in response of driving force And the ECU50 controls the power supply device 300 such that electric power in an amount equal to the predicted shortage can be supplied from the electric storage device B to the external device 400. The processing in S110 and S120 may be hereinafter also referred to as "feedforward control."

On the other hand, when it is determined that the elapsed time from the start of the engine 2 is not within the predetermined period of time (NO in S110), the ECU 50 turns on a flag 1 (FLG1) that shows the termination of the supply of electric power from the electric storage device B (S125).

Then, in S130, the ECU 50 calculates the torque that is being output from the engine 2. Here, when the hybrid vehicle 100 is stationary, the output from the engine 2 is transmitted to the motor generator MG1 via the power split device 4 and the torque of the engine 2 can be therefore calculated based on the operating conditions of the motor generator MG1.

In one instance, the ECU 50 can calculate the torque of the engine 2 based on the torque of the motor generator MG1. Alternatively, the ECU 50 may calculate the power of the motor generator MG1 from detection values of the torque and rotational speed of the motor generator MG1 and calculate the torque of the engine 2 based on the calculated power. The torque of the motor generator MG1 can be calculated from, for example, the generated electric power from the motor generator MG1. Alternatively, the ECU 50 may calculate the torque of the engine 2 from, for example, the engine speed, intake air amount and ignition timing of the engine 2.

Then, in S140, the ECU 50 determines whether the ratio of the engine torque to requested torque is lower than a predetermined value X. The term "requested torque" as used herein refers to the engine torque that is necessary to generate the electric power that must be supplied to the external device 400. The predetermined value X is a value that is used to determine whether the engine 2 can output the requested torque. In S140, the divergence between the engine torque and the requested torque may be learned to improve the precision further.

When it is determined that the ratio of the engine torque to the requested torque is lower than the predetermined value X (YES in S140), the ECU 50 continues the supply of electric power from the electric storage device B to the external device 400 (S150). Here, the ECU 50 calculates the shortage of the generated electric power that is derived from the driving force of the engine 2 relative to the electric power that must be supplied to the external device 400 based on the calculated engine torque, and controls the power supply device 300 such that electric power in an amount equal to the calculated shortage can be supplied from the electric storage device B to the external device 400. The processing in S130 to S150 may be hereinafter also referred to as "feedback control."

On the other hand, if it is determined that the ratio of the engine torque to requested torque is equal to or higher than the predetermined value X (NO in S140), the ECU 50 turns on a flag 2 (FLG2) that shows the termination of the supply of electric power from the electric storage device B (S155).

Then, in S160, the ECU 50 determines whether the FLG1 is on and/or the FLG2 is on. In other words, the ECU 50 determines whether at least one of the FLG1 and FLG2 is on.

When it is determined that the FLG1 is on and/or the FLG2 is on (YES in S160), the ECU 50 terminates the supply of electric power from the electric storage device B (S170). When it is determined that the FLG1 is off and the FLG2 is off (NO in S160), the subsequent processing is skipped and the control is returned to the main routine.

The supply of electric power from the electric storage device B may be terminated in view of both a condition that relates to the elapsed time from the start of the engine and a condition that relates to the engine torque relative to the requested torque as described above, or the supply of electric power from the electric storage device B may be terminated in view of either one of the conditions.

While the ECU 50 is described to execute both the feedforward control and the feedback control in the switching control in the foregoing, the ECU 50 may execute only the feedforward control or only the feedback control in the switching control.

FIG. 4 is a time chart that shows one example of switching control that is executed by the ECU 50 that is shown in FIG. 1. In FIG. 4, the horizontal axis represents time, and the vertical axis represents the engine speed, the engine torque, the amount of advance of the VVT device that is provided on the intake side, the ignition timing, the electric power that is requested by the external device 400, and the supply of electric power from the electric storage device B. The total electric power that is supplied in response to the request from the external device 400 is indicated by a solid line, the electric power that is supplied from the electric power that is derived from the engine 2 is indicated by a broken line, and the electric power that is supplied from the stored electric power in the electric storage device B is indicated by a dot-and-dash line.

Referring to FIG. 4, switching control that is executed to switch from the supply of electric power from the electric storage device B to the external device 400 to the supply of electric power from the motor generator MG1 to the external device 400 is started at time t1. When the switching control is started, the engine 2 is started. At this time, because the engine 2 is cranked by the driving force of the motor generator MG1, the engine torque takes a negative value. Then, when combustion is started in the engine 2 and driving force starts to be generated, the engine torque becomes a positive value.

At this time, because the decompression control is executed and the amount of advance of the VVT device on the intake side is therefore retarded, the timing of closure of the intake valves is delayed. Then, vibration is suppressed because the compression ratio decreases, and the torque of the engine 2 decreases.

Also, because the start ignition retarding control is executed, the ignition timing is once retarded and then gradually advanced. This prevents a shock that may be caused by a sudden increase in engine torque.

As described above, immediately after the engine 2 is started, the supply of electric power from the electric storage device B to the external device 400 is continued because sufficient engine torque cannot be obtained.

After the engine torque increases to a sufficient level at time t2, the generated electric power that is derived from the engine 2 increases. Along with this, the amount of electric power that is supplied from the electric storage device B to the external device 400 is gradually decreased.

When a state where the electric power that must be supplied to the external device 400 can be covered only by the generated electric power is reached at time t3, the supply of electric power from the electric storage device B is stopped and the switching control is terminated.

As described above, in this embodiment, the power supply device 300 and the engine 2 are controlled such that the engine 2 is started with the supply of electric power from, the electric storage device B to the external device 400 being continued during the switching control (t1 to t3). When the switching control is executed, the engine 2 is started and the generated electric power that is derived from the driving force of the engine 2 is supplied to the external device 400. At this time, because the supply of electric power from the electric storage device B to the external device 400 is continued, the shortage of the generated electric power due to a delay in response of the driving force of the engine 2 can be compensated for by the stored electric power. Thus, according to this embodiment, electric power can be supplied stably to an electric device outside the vehicle.

In addition, in this embodiment, the power supply device 300 is controlled such that the supply of electric power from the electric storage device B to the external device 400 is continued until a predetermined period of time has elapsed after the start of the engine. 2 during the switching control. Thus, electric power can be supplied from the electric storage device B to the external device 400 only for a necessary period that has been preliminarily determined in view of the shortage of the generated electric power at the start of the engine 2. Thus, over-discharge of the electric storage device B can be prevented.

In addition, in this embodiment, the shortage of the generated electric power relative to the electric power that must be supplied to the external device 400 is predicted and the power supply device 300 and the engine 2 are controlled such that electric power in an amount equal to the predicted shortage is supplied from the electric storage device B to the external device 400 during the switching control. Thus, an excessive supply of electric power from the electric storage device B can be prevented. As a result, the power input and output of the electric storage device B can be reduced and the electricity efficiency can be improved.

In addition, in this embodiment, the shortage of electric power is predicted based on a delay in response of the driving force of the engine 2 at the start of the engine 2. Thus, the shortage of electric power can be predicted precisely in view of a delay in response of the driving force of the engine 2.

In addition, in this embodiment, the power supply device 300 and the engine 2 are controlled such that electric power is supplied from the electric storage device B to the external device 400 when the generated electric power corresponding to the driving force of the engine 2 is insufficient relative to the electric power that must be supplied to the external device 400 during the switching control. Thus, the individual peculiarities of the engine 2, the changes of the engine with the passage of time, or the changes in output from the engine 2 depending on the operating environment can be detected. Thus, the shortage of generated electric power can be detected precisely.

While the hybrid vehicle 100, which is equipped with the catalyst 222, is described in the above embodiment, the hybrid vehicle 100 may not be equipped with the catalyst 222.

While a series/parallel-type hybrid vehicle in which the power from the engine 2 can be split and transmitted to the driving wheels 6 and the motor generators MG1 and MG2 by the power split device 4 is described in the above embodiment, the present invention is also applicable to hybrid vehicles of different types. For example, the present invention is also applicable to what is called a series-type hybrid vehicle in which the engine 2 is used only to drive the motor generator MG1 and the driving force for driving the vehicle is produced only by the motor generator MG2, a hybrid vehicle in which only the regenerative energy in all the kinetic energy that is produced by the engine 2 is recovered as electric energy, and a motor-assisted hybrid vehicle in which an engine is used as a main power source and a motor assists the engine when necessary. In addition, the present invention is also applicable to a hybrid vehicle in which the motor can be disconnected so that the vehicle can runs only on the power from the engine.

In the foregoing, the engine 2 corresponds to one example of the "internal combustion engine" of the present invention, and the motor generator MG1 corresponds to one example of the "rotating electric machine" of the present invention.

It should be understood that the embodiment that is disclosed herein is not limitative but illustrative in all respects. The scope of the present invention is defined not by the above description but by the appended claims, and is intended to encompass all modifications within the meaning and scope equivalent to the claims.

What is claimed is:

1. A hybrid vehicle, comprising:
   an internal combustion engine;
   a rotating electric machine configured to generate electric power using driving force of the internal combustion engine;
   an electric storage device configured to be charged and discharged;
   a power supply device configured to supply at least one of the generated electric power from the rotating electric machine or electric power stored in the electric storage device to an electric device outside the hybrid vehicle; and
   a controller configured to:
   (a) execute switching control to switch from a first electric power supply to a second electric power supply by starting the internal combustion engine, the first electric power supply being a supply of electric power from the electric storage device to the electric device and the second electric power supply being a supply of electric power from the rotating electric machine to the electric device;
   (b) during the switching control, predict shortage of the generated electric power relative to an electric power that must be supplied to the electric device based on a delay in response of driving force of the internal combustion engine at the start of the internal combustion engine; and
   (c) control the power supply device and the internal combustion engine, during the switching control, such that the internal combustion engine is started with the first electric power supply being continued and such that electric power in an amount equal to the predicted shortage is supplied from the electric storage device to the electric device.

2. The hybrid vehicle according to claim 1, wherein the controller controls the power supply device and the internal combustion engine, during the switching control, such that the first electric power supply is continued until a predetermined period of time elapses after the start of the internal combustion engine.

3. The hybrid vehicle according to claim 1, wherein the controller controls the power supply device and the internal combustion engine such that the first electric power supply is executed during the switching control and when the generated electric power corresponding to the driving force of the internal combustion engine is insufficient relative to the electric power that must be supplied to the electric device.

4. A control method for a hybrid vehicle, the hybrid vehicle including an internal combustion engine, a rotating electric machine, an electric storage device, a power supply device and a controller, the rotating electric machine being configured to generate electric power using driving force of the internal combustion engine, the electric storage device being configured to be charged and discharged, and the power supply device being configured to supply at least one of the generated electric power from the rotating electric machine or electric power stored in the electric storage device to an electric device outside the hybrid vehicle, the control method comprising:
   executing switching control, by the controller, to switch from a first electric power supply to a second electric power supply by starting the internal combustion engine, the first electric power supply being a supply of electric power from the electric storage device to the electric device and the second electric power supply being a supply of electric power from the rotating electric machine to the electric device, during the switching control, predicting shortage of the generated electric power relative to an electric power that must be supplied to the electric device based on a delay in response of driving force of the internal combustion engine at the start of the internal combustion engine, and controlling the power supply device and the internal combustion engine, by the controller, such that the internal combustion engine is started with the first electric power supply being continued during the switching control and such that electric power in an amount equal to the predicted shortage is supplied from the electric storage device to the electric device.

5. A hybrid vehicle, comprising:
an internal combustion engine;
a rotating electric machine configured to generate electric power using driving force of the internal combustion engine;
an electric storage device configured to be charged and discharged;
a power supply device configured to supply electric power to an electric device outside the hybrid vehicle through at least one of a first power supply path or a second power supply path, the first power supply path being a power supply path through which electric power stored in the electric storage device is supplied to the electric device and the second power supply path being a power supply path through which the generated electric power that is derived from the driving force of the internal combustion engine is supplied to the electric device; and
a controller configured to:
during the switching control, predict shortage of the generated electric power relative to an electric power that must be supplied to the electric device based on a delay in response of driving force of the internal combustion engine at start of the internal combustion engine; and
control, during the switching control in which the power supply device is controlled to switch the power supply path from the first power supply path to the second power supply path, the power supply device and the internal combustion engine such that the internal combustion engine is started with electric power being supplied to the electric device through the first power supply path and the second power supply path and such that electric power in an amount equal to the predicted shortage is supplied from the electric storage device to the electric device.

6. The hybrid vehicle according to claim 5, wherein
the controller controls the power supply device and the internal combustion engine, during the switching control, such that electric power is supplied to the electric device through the first power supply path and the second power supply path until a predetermined period of time elapses after the start of the internal combustion engine and the power supply path is switched from the first power supply path to the second power supply path when the predetermined period of time elapses.

7. A controller for a hybrid vehicle, the hybrid vehicle including an internal combustion engine, a rotating electric machine, an electric storage device, a power supply device and the controller, the rotating electric machine being configured to generate electric power using driving force of the internal combustion engine, the electric storage device being configured to be charged and discharged, the power supply device being configured to supply electric power to an electric device outside the hybrid vehicle through at least one of a first power supply path or a second power supply path, the first power supply path being a power supply path through which electric power stored in the electric storage device is supplied to the electric device and the second power supply path being a power supply path through which the generated electric power that is derived from the driving force of the internal combustion engine is supplied to the electric device, the controller comprising:
an ECU configured to:
during the switching control, predict shortage of the generated electric power relative to an electric power that must be supplied to the electric device based on a delay in response of driving force of the internal combustion engine at start of the internal combustion engine; and
control, during the switching control in which the power supply device is controlled to switch the power supply path from the first power supply path to the second power supply path, the power supply device and the internal combustion engine such that the internal combustion engine is started with electric power being supplied to the electric device through the first power supply path and the second power supply path and such that electric power in an amount equal to the predicted shortage is supplied from the electric storage device to the electric device.

8. The controller according to claim 7, wherein
the ECU controls the power supply device and the internal combustion engine, during the switching control, such that electric power is supplied to the electric device through the first power supply path and the second power supply path until a predetermined period of time elapses after the start of the internal combustion engine and the power supply path is switched from the first power supply path to the second power supply path when the predetermined period of time elapses.

* * * * *